(12) United States Patent
Gmirya (10) Patent No.: US 6,454,532 B1
(45) Date of Patent: Sep. 24, 2002

(54) HARMONIC DRIVE SYSTEM FOR THE RETRACTION/EXTENSION OF VARIABLE DIAMETER ROTOR SYSTEMS

(75) Inventor: Yuriy Z. Gmirya, Rego Park, NY (US)

(73) Assignee: Sikorsky Aircraft Corporation, Stanford, CT (US)

( * ) Notice: Subject to any disclaimer, the term of this patent is extended or adjusted under 35 U.S.C. 154(b) by 0 days.

(21) Appl. No.: 09/767,965

(22) Filed: Jan. 23, 2001

(51) Int. Cl.⁷ ............................................... B64C 11/28
(52) U.S. Cl. ........................................... 416/87; 74/640
(58) Field of Search ................... 416/87, 89, 170 R; 74/640

(56) References Cited

U.S. PATENT DOCUMENTS

| | | |
|---|---|---|
| 4,804,352 A | 2/1989 | Schmidt |
| 5,299,912 A | 4/1994 | Fradenburgh et al. |
| 5,636,969 A | 6/1997 | Matuska et al. |
| 5,642,982 A | 7/1997 | Matuska et al. |
| 5,655,879 A | 8/1997 | Kiely et al. |
| 6,026,711 A | 2/2000 | Tortora et al. |
| 6,030,177 A | 2/2000 | Hager |

*Primary Examiner*—Edward K. Look
*Assistant Examiner*—Kimya N McCoy (57) ABSTRACT

A drive system for a variable diameter rotor system includes a plurality of rotor blade assemblies with inner and outer blade segments. The outer blade segment being telescopically mounted to the inner blade segment. The VDR retraction/extension system includes a reeling system driven by a harmonic gear system. The reeling system includes a strap drum for winding and unwinding a strap attached to the outer blade segments. In operation, a control shaft drives the wave generator at a higher or lower rotational speed relative to a main rotor drive shaft assembly thereby causing the wave generator to rotate relative to the rotor hub assembly. In turn, the wave generator causes the external flex gear teeth to sequentially engage the ring gear internal gear teeth as the wave generator rotates within the flex gear. As the flex gear is mounted to the strap drum, the differential rotation between the flex gear and ring gear causes the strap drum to rotate relative the rotor hub assembly. Rotation of the strap drum thereby causes the strap to be wound about or off of the drum and, consequently, effecting retraction/extension of each VDR blade assembly.

24 Claims, 5 Drawing Sheets

HARMONIC DRIVE SYSTEM FOR THE RETRACTION/EXTENSION OF VARIABLE DIAMETER ROTOR SYSTEMS

This invention was made with government support under Contract No.: DABT63-99-3-0002 awarded by the Department of the Army. The government therefore has certain rights in this invention.

BACKGROUND OF THE INVENTION

The present invention provides a drive system for a variable diameter rotor blade system, and more particularly to a harmonic gear system to selectively extend and retract the variable diameter rotor blade system.

A tilt rotor or tilt wing aircraft typically employs a pair of rotor systems which are pivotable such that the rotors may assume a vertical or horizontal orientation. In a horizontal orientation (i.e., horizontal rotor plane), the aircraft is capable of hovering flight, while in a vertical orientation (i.e., vertical rotor plane), the aircraft is propelled in the same manner as conventional propeller-driven fixed-wing aircraft.

Variable Diameter Rotor (VDR) systems are known to provide distinct advantages. That is, when the plane of the rotor is oriented horizontally, the rotor diameter is enlarged for improved hovering efficiency and, when oriented vertically, the rotor diameter is reduced for improved propulsive efficiency.

One known example of a VDR blade assembly provides an outer blade segment configured to telescope over a torque tube member. A retraction/extension mechanism includes a planetary gear arrangement which is selectively drivable in either direction by a control shaft coaxially mounted within the rotor system drive shaft. The control shaft is selectively driven to extend and retract a reeling assembly attached to the outer blade segment. Controlling the extension and/or retraction of the outer blade segment relative to the torque tube thereby varies the rotor diameter.

The extension or retraction of the VDR system typically takes place in approximately 15–30 seconds. The remainder of the operational time there is no relative rotation between the planetary gear arrangement. An undesirable combination of high loads placed upon the non-rotating planetary gear arrangement may thereby cause fretting and pitting between the many intermeshed gears and bearings. Undesirable life reduction of the planetary gear arrangement may thereby result.

Accordingly, it is desirable to provide a VDR retraction/extension system which is light and compact while minimizing negative impact upon the VDR retraction/extension system when it is not being utilized.

SUMMARY OF THE INVENTION

The VDR retraction/extension system according to the present invention includes a reeling system driven by a harmonic gear system. The reeling system includes a strap drum rotatable about an axis of rotation. The harmonic gear system includes a ring gear, a flexible gear, and a wave generator. The harmonic gear system is mounted about the axis of rotation to selectively extend and retract each VDR blade assembly.

The ring gear is rigidly attached to the rotor hub assembly through a spline or the like, and includes a plurality of internal gear teeth within the ring gear inner diameter. The rotor hub assembly thus drives the attached ring gear.

The flex gear is attached to the strap drum and includes a plurality of external gear teeth about the flex gear outer diameter. The number of external flex gear teeth about the flex gear are less numerous than the number of internal gear teeth within the ring gear. The strap drum is thereby rotatably drivable by the attached flex gear.

The wave generator includes an elliptical disk enclosed within a bearing assembly. The wave generator is mounted within the bore of the flex gear to impart the shape of the elliptical disk to the flex gear.

In operation, a control shaft drives the wave generator at a higher or lower rotational speed relative to a main rotor drive shaft assembly thereby causing the wave generator to rotate relative to the rotor hub assembly. The wave generator may be driven in either direction depending upon the speed differential between the control shaft and the main rotor shaft. In turn, the wave generator causes the external flex gear teeth to sequentially engage the ring gear internal gear teeth as the wave generator rotates within the flex gear.

As the flex gear has fewer teeth than the ring gear, one revolution of wave generator causes relative motion between the flex gear and ring gear which equals the difference in teeth. As the flex gear is mounted to the strap drum, the differential rotation between the flex gear and ring gear causes the strap drum to rotate relative the rotor hub assembly. Rotation of the strap drum thereby causes the strap to be wound about or off of the drum and, consequently, effecting retraction/extension of each VDR blade assembly.

The present invention thereby provides a VDR drive system which is light and compact while minimizing any negative impact upon the VDR retraction/extension system when it is not being utilized.

BRIEF DESCRIPTION OF THE DRAWINGS

The various features and advantages of this invention will become apparent to those skilled in the art from the following detailed description of the currently preferred embodiment. The drawings that accompany the detailed description can be briefly, described as follows.

DETAILED DESCRIPTION OF THE PREFERRED EMBODIMENT

Figure 1A:
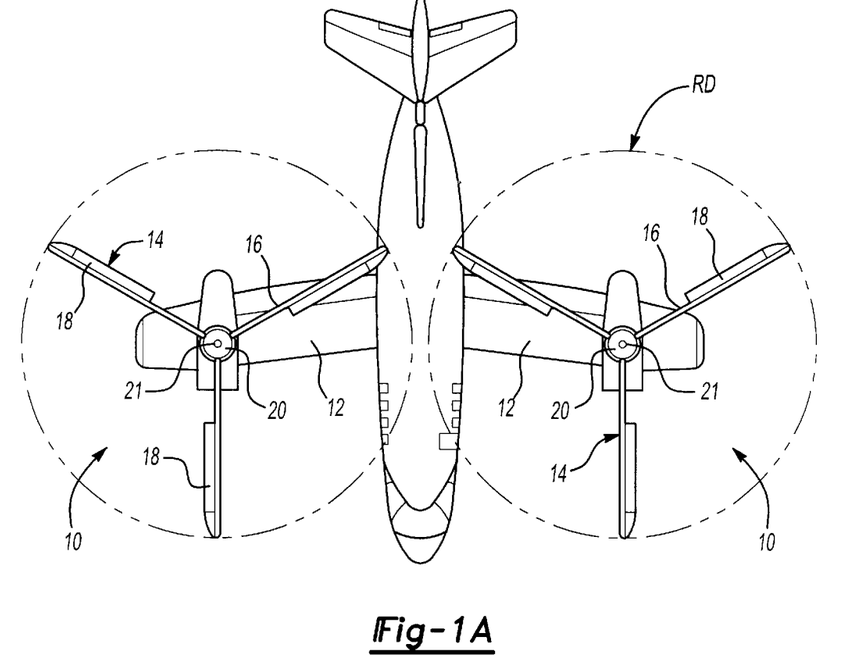
FIG. 1A is a plan view of a tilt-rotor aircraft illustrating the variable diameter rotor system according to the present invention in its horizontal position.
Figure 1B:
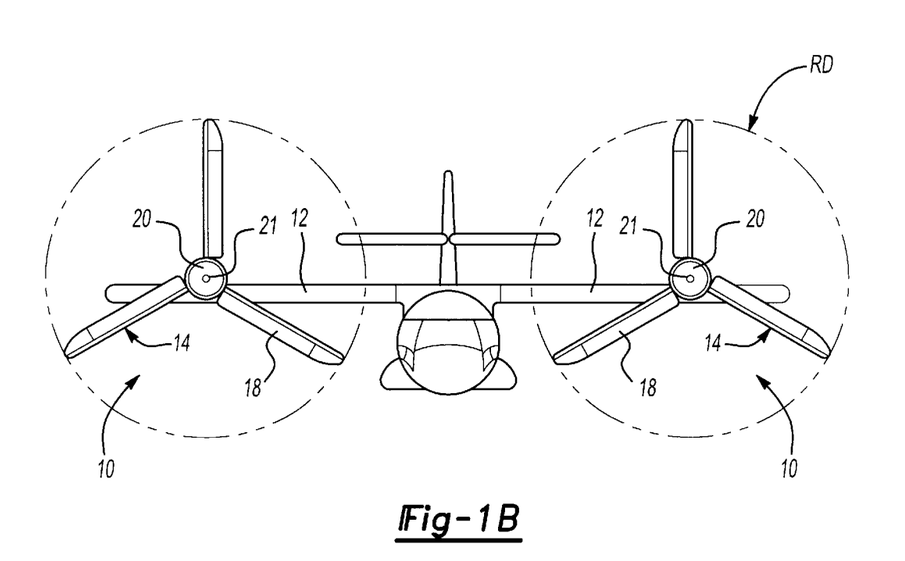
FIG. 1B is a front view of a tilt-rotor aircraft illustrating the variable diameter rotor system according to the present invention in its vertical position.

FIG. 1 schematically illustrates a tilt rotor aircraft that includes a pair of variable diameter rotor blade (VDR) systems 10. The VDR systems 10 are shown pivotally mounted on laterally extending wing sections 12 of an aircraft. The VDR systems 10 are pivotable between a horizontal or hover flight position, shown in FIG. 1A, and a vertical or forward flight position, shown in FIG. 1B.

Each VDR system 10 includes a plurality of variable diameter rotor blade assemblies 14 which are capable of being extended and retracted to vary the size of the rotor diameter (RD) as required. In order to effectuate the change in diameter, the VDR blade assemblies 14 include an inboard rotor blade section 16 and an outboard rotor blade section 18 which telescopes relative to the inboard rotor blade section 16. The VDR blade assembly 14 is mounted to and driven by a rotor hub assembly 20 about an axis of rotation 21.

Figure 2:
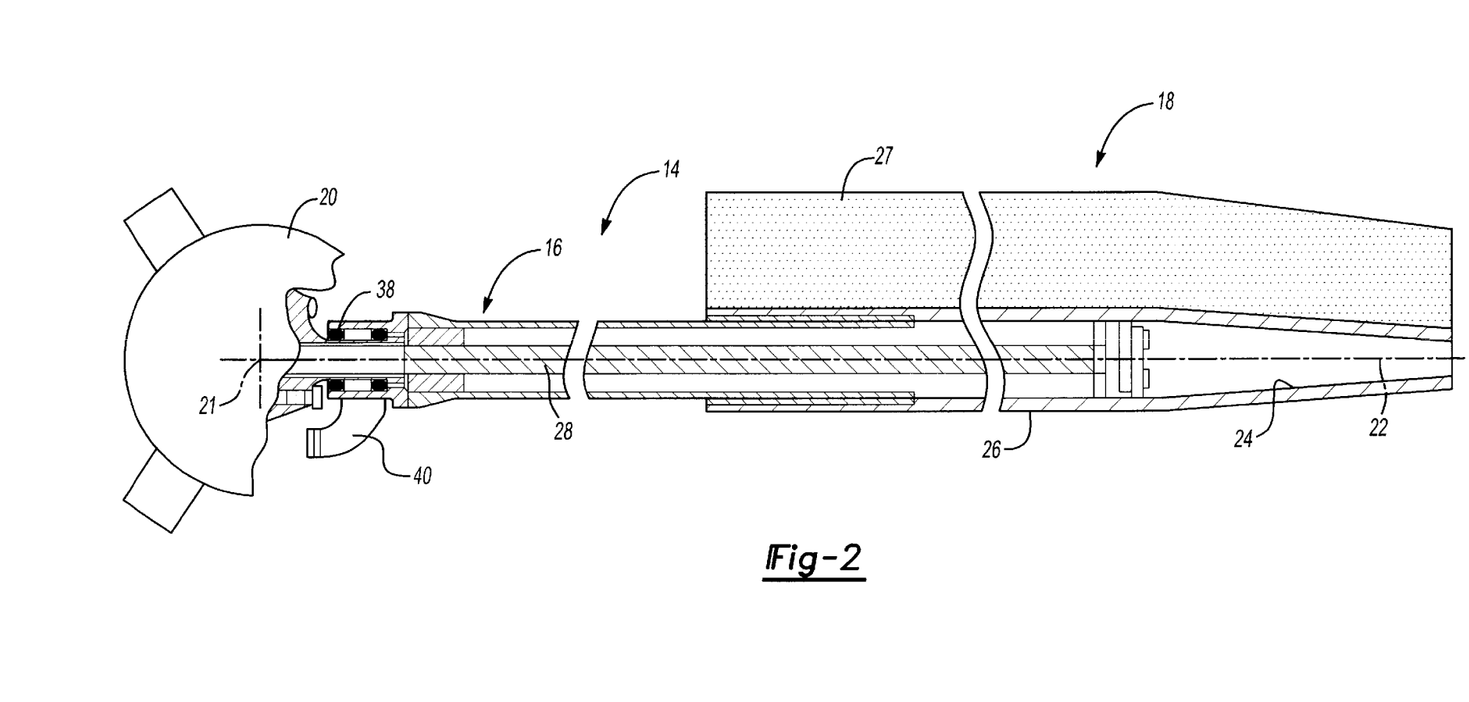
FIG. 2 is an expanded view of a Variable Diameter rotor blade assembly.

Referring to FIG. 2, each VDR blade assembly 14 includes the movable outboard rotor blade section 18 which telescopes over the inboard rotor blade section 16 (herein after referred to as a torque tube) along a longitudinal axis 22. The outboard rotor blade section 18 includes a hollow spar member 24 which is enveloped by a leading edge 26 and a trailing edge 27 to define the requisite aerodynamic contour of the outboard rotor blade section 18. The spar member 24 and thus the outboard rotor blade section 18 are thereby telescopically retractable and extendable relative to the torque tube 16 by a drive strap 28 or the like attached to the outboard rotor blade section 18. Preferably, the drive strap includes multi-fiber materials and/or multi-cable construction to provide redundant load paths for ballistic survivability.

Figure 3A:
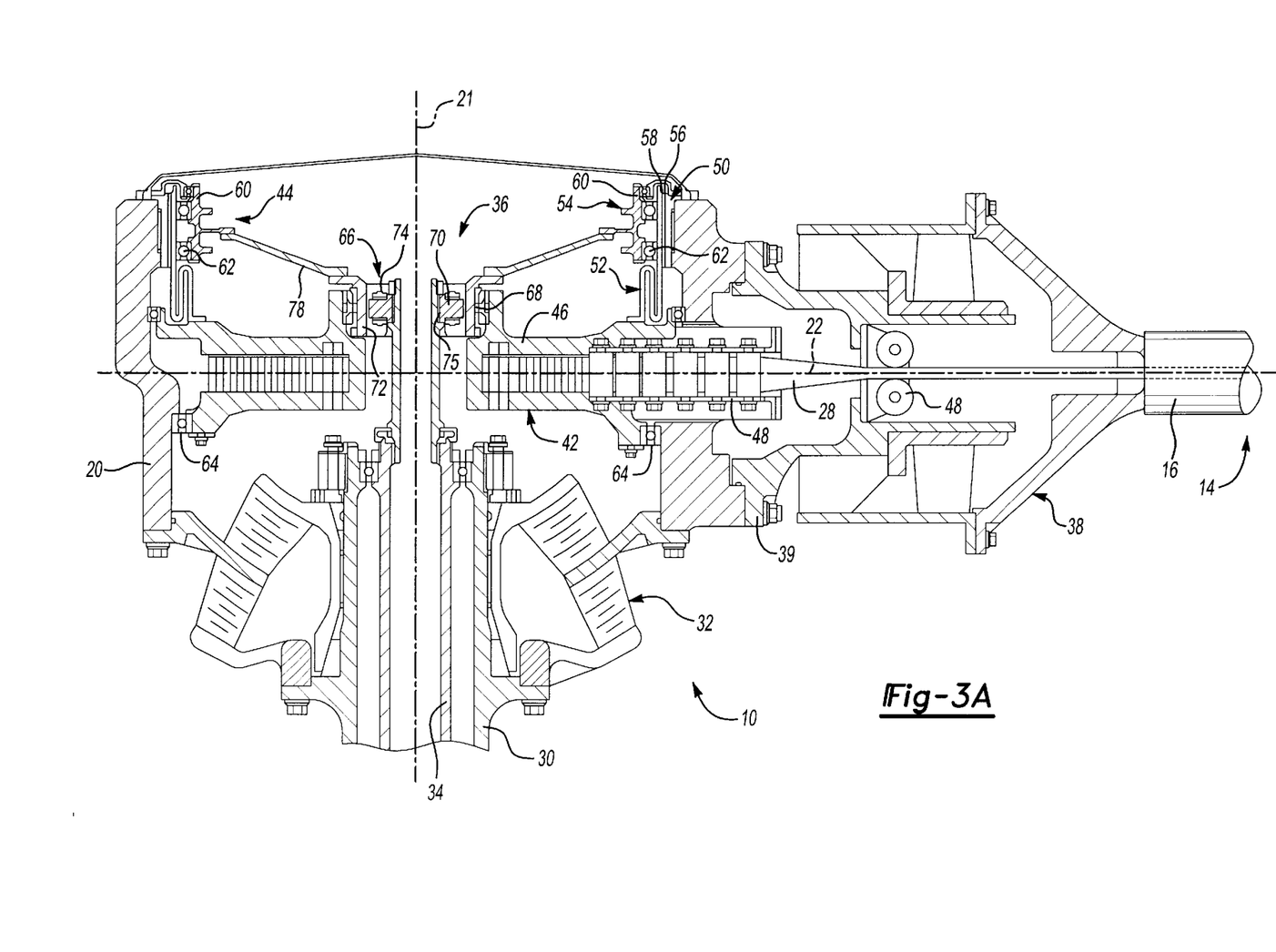
FIG. 3A is a sectional view of a VDR drive system designed according to the present invention.

Referring to FIG. 3A, a cross-sectional view of the variable diameter rotor system 10 is illustrated. The rotor hub assembly 20 is mounted to a main rotor shaft 30 which rotatably drives the rotor hub assembly 20 about the rotational axis 21. The main rotor shaft 30 is attached to a transmission (not shown) which rotates the main rotor shaft in a prescribed direction and speed.

The main rotor shaft 30 is preferably attached to the rotor blade assemblies 14 through a gimbaled bearing assembly 32. The gimbaled bearing 32 transmits rotor thrust loads to the main rotor shaft and permits the hub assembly 20 to have limited angular (pivotal) movement with respect to the main rotor shaft 30. The gimbaled bearing 32 provides tilting of the rotor plane relative to the rotational axis 21 resulting in a thrust vector to maneuver the aircraft in the helicopter mode. The gimbaled bearing 32 also provides reduced blade root stresses resulting from out of plane blade flapping motion that occurs from rotor cyclic and vertical gust inputs.

In order to control extension and retraction of the outer blade segment 18 (FIG. 2), the present invention includes a second drive shaft or actuation input control shaft 34 which is preferably located within the main rotor shaft 30 concentrically within and rotatable with respect to the main rotor shaft 30. The blade actuation shaft 34 is engaged with a suitable actuation system (not shown) so as to be rotatable relative to the main rotor shaft 30.

The control shaft 34 drives a VDR retraction/extension system 36 which collectively controls each VDR blade assembly 14 of the variable diameter rotor system 10. Insofar as each VDR blade assembly 14 is essentially identical, it should be understood that the following description of the exemplary VDR blade assembly 14 and the interacting components of the retraction/extension system 36 are applicable to all blade assemblies 14 of the VDR system.

An inboard portion of the torque tube member 16 is mounted to a cuff assembly 38 which is mounted to a radial arm 39 of the rotor hub assembly 20. The cuff assembly 38 includes a pitch control arm 40 (FIG. 3B) through which pitch control inputs are made about the longitudinal axis 22 of the VDR blade assembly 14.

The retraction/extension system 36 according to the present invention includes a reeling system 42 (also shown in FIG. 3b) driven by a harmonic gear system 44. The reeling system 42 includes a strap drum 46 rotatable about the rotational axis 21.

Figure 3B:
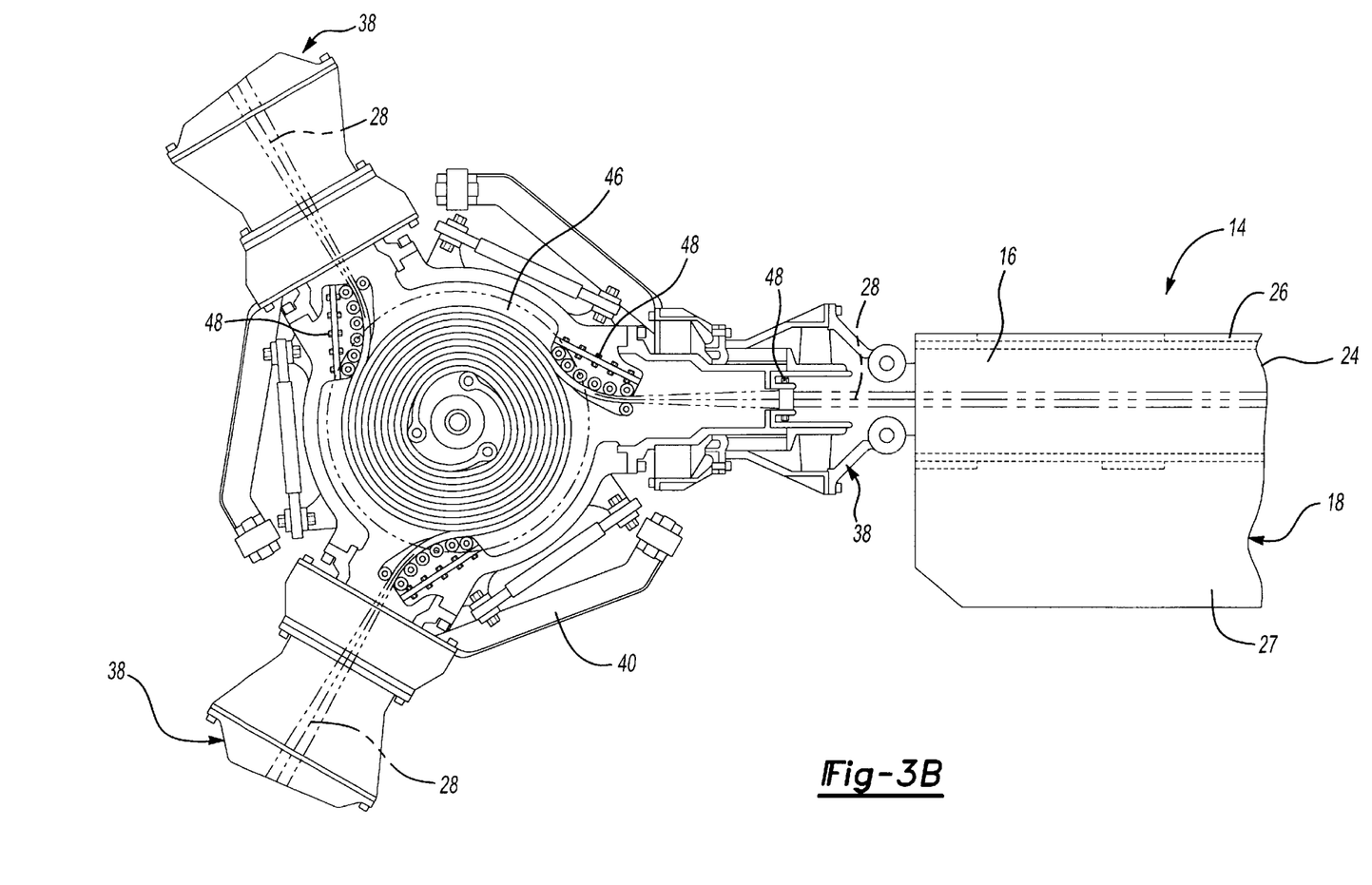
FIG. 3B is a top view of the VDR drive system illustrating a reeling assembly.

The reeling system 42 extends and retracts the drive strap 28 which is wound about or wound off of the strap drum 46. The strap 28 is disposed in winding combination with the strap drum 46 and extends between a multiple of guide pulleys 48, or other suitable guides, for centering the strap 28 in substantial alignment with the longitudinal axis 22 of the rotor blade assembly 14. The strap 28 extends through the torque tube 16 and is affixed at its outboard end to the spar member 24 (FIG. 2).

Figure 3C:
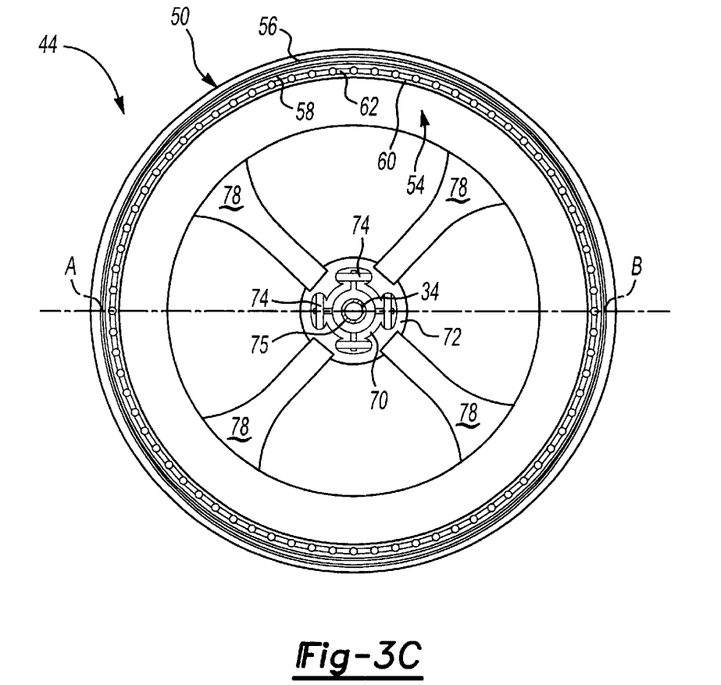
FIG. 3C is a top view of the VDR drive system illustrated a harmonic gear system according to the present invention.

The harmonic gear system 44 includes a ring gear 50, a flexible gear 52, and a wave generator 54 (also illustrated in FIG. 3C). The harmonic gear system 44 is preferably mounted about the axis of rotation 21 to selectively extend and retract each VDR blade assembly 14.

The ring gear 50 is rigidly attached to the rotor hub assembly 20 through a spline or the like, and includes a plurality of internal gear teeth 56 within the ring gear 50 inner diameter. The ring gear 50 is mounted concentrically about the axis of rotation 21. The rotor hub assembly 20 thus drives the attached ring gear 50.

The flex gear 52 is attached to the strap drum 46 and includes a plurality of external gear teeth 58 about the flex gear 52 outer diameter. The number of external flex gear teeth 58 about the flex gear 52 are less numerous than the number of internal gear teeth 56 within the ring gear 50. Preferably, a gear reduction of 350:1 is provided. The flex gear 52 is a substantially non-rigid cylinder preferably manufactured of a spring steel or the like. The strap drum 46 is thereby rotatably drivable by the flex gear 52.

The wave generator 54 includes an elliptical disk 60 enclosed within a bearing assembly 62. The wave generator 54 is mounted within the bore of the flex gear 52 (also illustrated in FIG. 3B) to impart the shape of the elliptical disk 60 to the flex gear 52.

By mounting the wave generator 54 within the bore of the flex gear 52, the external flex gear teeth 58 engage the internal gear teeth 56 within the ring gear 50 preferably at two equally spaced locations (A, B: FIG. 3C) 180 degrees apart on their respective circumferences. A positive gear mesh is thus formed at these points of engagement.

The strap drum 46 is disposed internally of the rotor hub assembly 20. The outer diameter of the strap drum 46 rotatably engages the rotor hub assembly 20 through an outer bearing assembly 64. The inner diameter of the strap drum 46 rotatably engages a constant velocity joint assembly 66 affixed to the control shaft 34. An inner bearing assembly 68 further mounts the inner diameter of the strap drum 46 to the constant velocity joint assembly 66. The strap drum 46 may thereby rotate independently of the constant velocity joint assembly 66 and the rotor hub assembly 20. It should be realized that although a constant velocity joint is illustrated in the disclosed embodiment, other strap drum 46 mounting arrangements will benefit from the present invention.

The constant velocity joint assembly 66 includes a spider 70 mounted to tile control shaft 34 through splines 75 or the like. Roller bearings 74 are rotatably mounted to the spider 70 and fit within an outer housing 72. The inner bearing assembly 68 rides upon the outer housing 72 of the constant velocity joint assembly 66 such that the strap drun 46 freely rotates about the constant velocity joint assembly 66. The strap drum 46 thus rotates upon the constant velocity joint assembly 66 independently of the control shaft 34, i.e., in either direction relative thereto. The constant velocity joint assembly 64 provides axial and pivotal movement of the strap drum 46 and synheronized tilting with the rotor hub assembly 20. The CV joint is included in the design because of the gimbaled hub. if the hub is rigid the drive system would not require the CV joint.

Figure 4:
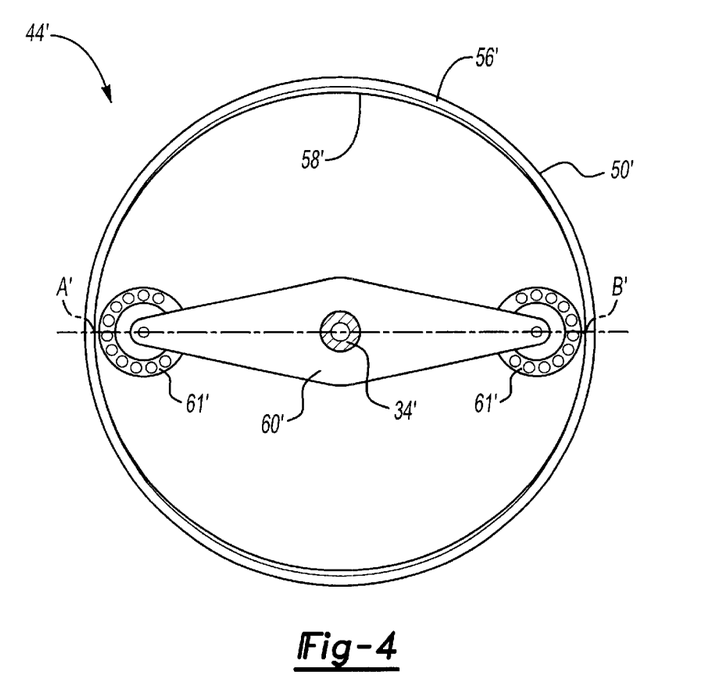
FIG. 4 is another embodiment of a harmonic gear system according to the present invention.

An extension 78 mounted between the constant velocity joint assembly 66 and the wave generator 54 allows input from the control shaft 34 to drive the wave generator 54. Although the extensions are illustrated as spoke like members, other attachments such as complete or partial disks may alternatively or additionally attach the constant velocity joint assembly 66 and the wave generator 54. Other harmonic gear systems with other wave generators will also benefit from the present invention. In another embodiment (FIG. 4), the wave generator includes a rotatable arm member 60' mounted to a control shaft 34' to rotate circular bearing assembly 61' on each end of the arm member 60'.

In operation, the control shaft 34 drives the wave generator 54 at a higher or lower rotational speed relative to the main drive shaft 22 thereby causing the wave generator to rotate relative to the rotor hub assembly 20. The wave generator 54 may be driven in either direction depending upon the speed differential between the control shaft 34 and the main rotor shaft 22. In turn, the wave generator 54 causes the external flex gear teeth 58 to sequentially engage the ring gear internal gear teeth 56 as the wave generator 54 rotates within the flex gear 52.

As the flex gear 52 has fewer teeth than the ring gear, one revolution of wave generator 54 causes relative motion between the flex gear 52 and ring gear 50 which equals the difference in teeth. Preferably, the number of teeth and the difference therebetween equates to a gear reduction of 350: 1. The reduction ratio maybe calculated, by the following relationship:

$$\text{Reduction ratio} = Z_1/Z_2 - Z_1,$$

Where:
$Z_1$=number of teeth on the flexible gear; and
$Z_2$=number of teeth on the fixed gear.
Thus, if $Z_1$=700, and $Z_2$=702→
The reduction ratio=700/702−700=350.

As the flex gear 52 is mounted to the strap drum 46, the differential rotation between the flex gear 52 and ring gear 50 causes the strap drum 46 to rotate relative the rotor hub assembly 20. Rotation of the strap drum 46 thereby causes the strap 28 to be wound about or off of the drum 46 and, consequently, effecting retraction/extension of each VDR blade assembly 14. Preferably, the strap drum 46 is driven at a rotational speed which effects fall retraction/extension in about a 10 to 20 second interval.

It should be realized that when the VDR blade assemblies 14 are not being extended or retracted, the control shaft 34 rotates at the same relative velocity as the main rotor shaft 30 and attached rotor hub assembly 20. Likewise, the ring gear 50, flexible gear 52, and wave generator 54 rotate at the same velocity as the main rotor shaft 30 and attached rotor hub assembly 20. The external flex gear teeth 58 thus only movably engage the internal gear teeth 56 when there is differential rotation between the control shaft 34 and the main rotor shaft 30.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A retraction/extension system for a variable diameter rotor blade system having a rotor hub and a multiple of rotor blade assemblies, each of said rotor blade assemblies having an outboard blade section telescopically mounted to an inboard blade section, said system comprising:

a reeling assembly attached to each of said outboard blade sections of said variable diameter rotor blade system; and a harmonic gear system for driving said reeling assembly to effect telescopic transition of each of the outboard blade section relative to each inboard blade section.

2. The system as recited in claim 1, further comprising a main rotor shaft attached to the rotor hub and a control shaft attached to said harmonic gear system, said control shaft coaxially mounted within said main rotor shaft along a first axis, said control shaft rotatable relative to said main rotor shaft to selectively drive said harmonic gear system.

3. The system as recited in claim 1, wherein said harmonic gear system includes a ring gear attached to the rotor hub.

4. The system as recited in claim 1, wherein said reeling assembly includes a strap drum to windingly extend and retract a drive strap attached to the outboard blade section.

5. The system as recited in claim 4, wherein said harmonic gear system includes a flexible gear attached to said strap drum.

6. The system as recited in claim 4, further comprising a constant velocity joint mounted to a control shaft, said strap drum mounted through a bearing to said constant velocity joint.

7. The system as recited in claim 4, wherein said harmonic gear system includes a wave generator mounted to said strap drum.

8. The system as recited in claim 1, wherein said harmonic gear system includes, a ring gear attached to the rotor hub;

a flex gear mounted to said reeling assembly; and a wave generator rotatable within said flex gear, rotation of said wave generator causing rotation of said flex gear relative to said ring gear to drive said reeling assembly.

9. The system as recited in claim 8, further comprising a main rotor shaft attached to the rotor hub and a control sliafl attached to said wave generator, said control shaft coaxially mounted within said main rotor shaft along a first axis, said control shaft rotatable relative to said main rotor shaft to selectively drive said wave generator.

10. A retraction/extension system for a variable diameter rotor blade system having a rotor hub and a multiple of rotor blade assemblies, each of said rotor blade assemblies having an outboard blade section telescopically mounted to an inboard blade section, said system comprising:

a reeling assembly including a strap drum for driving a strap attached to each of said outboard blade sections of said variable diameter rotor blade system;

a ring gear attached to the rotor hub;

a flex gear mounted to said strap drum; and a wave generator rotatable within said flex gear, rotation of said wave generator causing rotation of said flex gear relative to said ring gear to drive said strap drum and effect telescopic transition of each of said outboard blade section relative to each inboard blade section.

11. The system as recited in claim 10, further comprising a main rotor shaft attached to the rotor hub and a control shaft attached to said harmonic gear system, said control shaft coaxially mounted within said main rotor shaft along a first axis, said control shaft rotatable relative to said main rotor shaft to selectively drive said wave generator.

12. The system as recited in claim 10, further comprising a constant velocity joint mounted to said control shaft, said strap drum mounted through a bearing to said constant velocity joint.

13. The system as recited in claim 10, further comprising a bearing assembly between said wave generator and said flex gear.

14. The system as recited in claim 10, wherein said wave generator includes an elliptical plate-like member.

15. The system as recited in claim 10, wherein said wave generator includes a rotatable arm having a circular bearing rotatably mounted at each end of said rotatable arm.

16. The system as recited in claim 10, wherein said ring gear includes a plurality of ring gear teeth along an inner diameter of said ring gear and said flex gear includes a plurality of flex gear teeth along an outer diameter of said flex gear, said plurality or ring gear teeth being greater than said plurality of flex gear teeth.

17. The system as recited in claim 16, wherein said plurality of ring gear teeth engage said plurality of flex gear teeth at equally spaced locations apart on their respective circumferences.

18. A variable diameter rotor blade system, comprising:
    a rotor hub having a multiple of rotor blade assemblies, each Or said rotor blade assemblies having an outboard blade section telescopically mounted to an inboard blade section;
    a main rotor shaft for driving said rotor hub, said main rotor shaft defining a first axis;
    a control shaft mounted along said first axis coaxially with said main rotor shaft;
    a reeling assembly comprising a strap drum for winding and unwinding a strap attached to each of said outboard blade sections of said variable diameter rotor blade system;
    a ring gear attached to said rotor hub,
    a flex gear mounted to said strap drum; and
    a wave generator attached to said control shaft, said control shaft rotatable relative to said main rotor shaft such that said wave generator is rotatable within said flex gear, rotation of said wave generator causing rotation of said flex gear relative to said ring gear to drive said strap drum and effect telescopic transition of each of said outboard blade section relative to each inboard blade section.

19. The system as recited in claim 18, wherein said ring gear includes a plurality of ring gear teeth along an inner diameter of said ring gear and said flex gear includes a plurality of flex gear teeth along an outer diameter of said flex gear, said plurality or ring gear teeth being greater than said plurality of flex gear teeth.

20. The system as recited in claim 18, wherein said plurality of ring gear teeth engage said plurality of flex gear teeth at equally spaced locations apart on their respective circumferences.

21. The system as recited in claim 18, further comprising a constant velocity joint mounted to said control shall, said strap drum mounted through a bearing to said constant velocity joint.

22. A retraction/extension system for a variable diameter rotor blade system having a rotor hub and a multiple of rotor blade assemblies, each of said rotor blade assemblies having an outboard blade section telescopically mounted to an inboard blade section, said system comprising:
    a reeling assembly attached to each of said outboard blade sections, said reeling assembly comprising a strap drum to windingly extend and retract a drive strap attached to the outboard blade section;
    a constant velocity joint mounted to a control shaft, said strap drum mounted through a bearing to said constant velocity joint; and
    a harmonic gear system for driving said reeling assembly to effect telescopic transition of each of the outboard blade section relative to each inboard blade section.

23. A retraction/extension system for a variable diameter rotor blade system having a rotor hub and a multiple of rotor blade assemblies, each of said rotor blade assemblies having an outboard blade section telescopically mounted to an inboard blade section, said system comprising:
    a reeling assembly including a strap drum for driving a strap attached to each of said outboard blade sections;
    a ring gear attached to the rotor hub;
    a flex gear mounted to said strap drum; and
    a wave generator comprising an elliptical plate-like member rotatable within said flex gear, rotation of said wave generator causing rotation of said flex gear relative to said ring gear to drive said strap drum and effect telescopic transition of each of said outboard blade section relative to each inboard blade section.

24. A retraction/extension system for a variable diameter rotor blade system having a rotor hub and a multiple of rotor blade assemblies, each of said rotor blade assemblies having an outboard blade section telescopically mounted to an inboard blade section, said system comprising:
    a reeling assembly including a strap drum for driving a strap attached to each of said outboard blade sections;
    a ring gear attached to the rotor hub;
    a flex gear mounted to said strap drum; and
    a wave generator rotatable within said flex gear, said wave generator comprising a rotatable arm and a circular bearing rotatably mounted at each end of said rotatable arm, rotation of said wave generator causing rotation or said flex gear relative to said ring gear to drive said strap drum and effect telescopic transition of each of said outboard blade section relative to each inboard blade section.

* * * * *

UNITED STATES PATENT AND TRADEMARK OFFICE
CERTIFICATE OF CORRECTION

PATENT NO.    : 6,454,532 B1
DATED         : September 24, 2002
INVENTOR(S)   : Gmirya It is certified that error appears in the above-identified patent and that said Letters Patent is hereby corrected as shown below:

<u>Title page,</u>
Item [73], Assignee, City of Assignee "Stanford" should read -- Stratford --

<u>Column 6,</u>
Line 53, "sliafl" should read -- shaft --;

<u>Column 7,</u>
Line 37, "Or" should read -- on --;

<u>Column 8,</u>
Line 8, "shall" should read -- shaft --;
Line 55, "or" should read -- of --.

Signed and Sealed this

Fourteenth Day of January, 2003

JAMES E. ROGAN
*Director of the United States Patent and Trademark Office*